Patented June 4, 1929.

1,715,932

UNITED STATES PATENT OFFICE.

VAMAN R. KOKATNUR, OF NEW YORK, N. Y.

PROCESS OF PRESERVING CITRUS FRUIT JUICES.

No Drawing. Application filed January 14, 1927. Serial No. 161,243.

This invention relates to the preservation of citrous fruit juices such, for example, as orange juice, grape fruit juice, tangerine juice, lemon juice, and in its preferred practice is intended for use more particularly in the preservation of citrous fruit juices for employment as nonalcoholic beverages and in the preparation of nonalcoholic fruit beverages.

The principal object of this invention is to provide a process for preserving citrous fruit juices in such a manner that the juices will remain in their natural condition and preserve their natural flavor, vitamines, and aroma over long periods of time.

Another object of this invention is to provide a process for preserving citrous fruit juices wherein the preservative employed forms a normal part of the skin of the fruit whereby the preserved product is free from any added deleterious ingredient.

A further object of this invention is to provide a process of preserving citrous fruit juices by means of an aqueous or citrous juice extract obtained from the skins of the fruit from which the juice has been expressed and a subsequent pasteurization of the juice at such temperature that the flavor, appearance and aroma of the fruit juices will not be affected or impaired by the heat of pasteurization.

Other objects and advantages of this process will become apparent during the course of the following description.

Numerous efforts have been made to preserve citrous fruit juices in their natural condition but, so far as I am aware, no process heretofore has been suggested or employed which will preserve the fruit juices without deleteriously affecting such juices either in taste, odor or appearance. For example, in order to preserve the juice of citrous fruits it has been proposed to pasteurize such juice at an elevated temperature but such a method is attended with the disadvantage that such pasteurization modifies the color of the juice and alters its flavor with the result that the juice after such treatment does not possess the desirable characteristics of fresh citrous fruit juice. It also has been proposed to preserve citrous fruit juices with chemical preservatives but this method has the disadvantage that the chemical preservatives employed modify the flavor of the juices and the product can not be marketed as natural fresh fruit juice. Another method of preserving citrous fruit juices proposed has contemplated the breaking down of proteid substances suspended in the fruit juices by means of the action of a proteolytic enzyme followed by the pasteurization of the thus treated juice at an elevated temperature. It will be readily apparent however that this method changes the constitution of the fruit juice in such a manner that the treated juice does not possess the characteristics of natural fresh fruit juice.

The principal purpose of this invention is to overcome the above enumerated disadvantages by providing a process which will preserve citrous fruit juice for a long period in its natural fresh condition. It is obvious that such a method opens up a new commercial field by permitting citrous fruit growers to express the juice from the fruit at the place at which the fruit is grown and to bottle or otherwise package such juice at such place for shipping to remote points. Such procedure is more economical and efficient than the present practice of crating and shipping the fruit in refrigerator cars and subsequently expressing the juice from the fruit at the point at which it is to be consumed. Moreover my process makes commercially possible the use of fresh fruit juices in soft drinks and beverages since the fermentation or deterioration of such beverages from the presence of inefficiently or incompletely preserved citrous fruit juices, as is the case with beverages containing such juices preserved by methods heretofore employed, is avoided.

In the preferred practice of my process I express the juice from citrous fruits, such as oranges, by any suitable means. I then grind in any suitable grinder, such, for example, as an ordinary meat grinder, one quarter of the skins remaining after the expressing of the juice and to the mass of ground skins I add water in the preferred proportion of one-half pint of water to each two whole skins employed. Instead of water, I may add the extracted juice to the mass of ground skins in similar proportions. This mixture is allowed to stand at an ordinary atmospheric temperature for approximately fifteen minutes and is preferably stirred during such period, after which the liquid is filtered from the residue. Such liquid extract of the skins is then added to the previously expressed fruit juice in the preferred proportion of from one to three teaspoonfuls of the extract to approximately seven ounces of the juice. If an amount of the aqueous extract of the skins materially in excess of that indicated above is added to the juice such juice after the subsequent heat treatment will have a somewhat bitter flavor and if materially less than such amount is employed the final product will not be perfectly preserved. The extract should be added in such proportion as to serve its stated purpose but preferably without substantially altering the flavor of the juice. The amount of extract added expressed in terms of percentage of oranges used is as follows. In the preferred practice about 5 to 10 per cent skin extract is added to the juice before pasteurization. Thus to preserve the juice of 100 oranges, the extract of from 5 to 10 orange skins in about 20 ounces of water or preferably in the juice itself is added before pasteurization. If the amount of extract added is above 30 per cent the juice tastes distinctly bitter and hence it is advisable not to exceed this limit. The thus treated juice is then placed in containers and pasteurized at a temperature of from 45 to 55° C. and preferably at about 50° C. for approximately two and one-half hours. This period may be varied according to the nature and source of the juice under treatment. However, temperature of pasteurization indicated above should not be materially exceeded since the appearance and taste of the product will be deleteriously affected by excessive heat. After the pasteurization is complete the containers are sealed and the juice is then in condition for shipment or sale and in such condition the juice will preserve its natural characteristics of appearance, flavor, and aroma for long periods of time.

I have also discovered that citrous fruit juices treated in the manner described above will retain their natural characteristics for reasonable periods even when exposed to the air. This is an important advantage of my process since, as is well known, untreated citrous fruit juices readily ferment and acquire an offensive odor and taste in a very short time if exposed to the air.

From the foregoing it will be apparent that I have provided a simple, efficient and economical process of preserving citrous fruit juices in their natural fresh condition so that such juices may be shipped for great distances or kept for considerable periods of time without deterioration.

By the term "extraneous preservative" is meant any preservative not wholly derived from citrous fruit.

While I have described in detail the preferred practice of my process it is to be understood that the details of procedure and the proportions of ingredients may be widely varied without departing from the spirit of the invention or the scope of the subjoined claims.

I claim:

1. The herein described process of preserving citrous fruit juices which comprises mixing a relatively small proportion of an extract of the skin of citrous fruit with the juice of said fruit, but without addition of any extraneous preservative, and pasteurizing the thus treated juice at a relatively low pasteurizing temperature.

2. The herein described process of preserving citrous fruit juices which comprises mixing an extract of the skin of citrous fruit, but without addition of any extraneous preservative, with the juice of said fruit and pasteurizing the thus treated juice at a temperature of from 45 to 55° C.

3. The herein described process of preserving citrous fruit juices which comprises mixing an aqueous extract of the skin of citrous fruit with the juice of said fruit, but without addition of any extraneous preservative, and heating the thus treated juice at a temperature of from 45 to 55° C. for at least two and one-half hours.

4. The herein described process of preserving orange juice which comprises expressing the juice of oranges, grinding a portion only of the skins remaining, adding water to the ground skins, filtering the aqueous suspension of the ground skins, adding a small amount of the extract to the juice expressed but without addition of any extraneous preservative, and pasteurizing the thus treated juice at from 45 to 55° C.

5. The herein described process of preserving orange juice which comprises expressing the juice from oranges, grinding a portion only of the skins remaining, adding water to the ground skins in the proportion of approximately one-half pint of water to each two whole skins employed, filtering the aqueous suspension of the ground skins, adding the filtered extract to the juice expressed, but without addition of any extraneous preservative, in approximately the proportion of about 5 per cent, by volume, and pasteurizing the thus treated juice at a temperature of from 45 to 55° C.

6. The herein described process of preserving orange juice which comprises expressing the juice of oranges, grinding approximately one-fourth of the skins remaining, adding water to the ground skins, allowing the mixture to stand at ordinary atmospheric temperature for about fifteen minutes, filtering the aqueous suspension of the ground skins, adding the filtered liquid extract to the juice expressed in approximately the proportion of about 5 per cent by volume, and heating the thus treated juice at a temperature of approximately 50° C. for approximately two and one-half hours.

7. The process of preserving citrous fruit juices which comprises mixing a relatively small proportion of an extract of the skin of the said fruit with the juice, but without addition of any extraneous preservative, and pasteurizing the thus treated juice at a temperature not substantially above 55° C.

In testimony whereof I affix my signature.

VAMAN R. KOKATNUR.